UNITED STATES PATENT OFFICE.

LOUIS RABINOVITZ, OF MONTCLAIR, NEW JERSEY, ASSIGNOR TO ELLIS-FOSTER COMPANY, A CORPORATION OF NEW JERSEY.

MAKING PURE CHLORBENZOL.

1,189,736.  Specification of Letters Patent.  Patented July 4, 1916.

No Drawing.  Application filed January 19, 1916. Serial No. 72,947.

*To all whom it may concern:*

Be it known that I, LOUIS RABINOVITZ, a citizen of the United States, and a resident of Montclair, in the county of Essex and State of New Jersey, have invented certain new and useful Improvements in Making Pure Chlorbenzol, of which the following is a specification.

This invention relates to a method of chlorinating organic compounds, especially benzol to make pure chlorbenzol and the like and comprehends the treatment of benzol preferably with air-free chlorin preferably in the presence of a catalyzer of peculiar distributing and suspending qualities.

The catalytic material in its initial form preferably is prepared by reacting with ferric chlorid on finely-powdered iron such as iron reduced by alcohol or by hydrogen and the like.

An illustrative method of preparing the catalytic material is to mix equal weights of iron reduced by hydrogen and ferric chlorid containing about six molecules of water of hydration. These are thoroughly triturated in a mortar and at first liquefaction takes place but on standing a rise in temperature occurs and the mass becomes converted into a solid product, which is ground preferably to pass a one hundred mesh screen and is carefully dried. The reaction between the ferric chlorid and the finely-divided iron produces a sub-chlorid in so finely-divided a state that it is very susceptible to the action of chlorin and distributes itself readily throughout the benzol or other material which is being chlorinated, serving as a very efficient carrier of chlorin to the material.

The heat developed in the chlorination of benzol to form chlorbenzol is so great that the temperature has to be carefully controlled or tar and resins result and I find that working at a temperature between 10 and 15° C., affords good result while the chlorin is taken up so rapidly under these conditions using the catalyzer herein that scarcely any odor of chlorin can be detected coming from the reaction mixture even though employing small quantities of benzol such for example as would be the case when carrying out experiments in the laboratory in small vessels.

The benzol is preferably agitated during the chlorination operation and the treatment may be carried out in tall tanks fitted with an agitator shaft and paddles and equipped with a cooling coil or jacket. The chlorin used for the purpose may be previously liquefied as in that way air or oxygen are removed and the danger of simultaneous chlorination and oxidation with formation of resinous bodies and tars is reduced to a minimum, much wasting being thereby eliminated.

An illustration of the process is the following:—200 parts by weight of benzol and 2 parts of the above catalyzer were subjected with agitation for four hours to a current of dry air-free chlorin gas while maintaining the temperature between 10 and 15°. No chlorin escaped as absorption was complete. Pure hydro-chloric acid was formed. The product was washed, dried and distilled and was found to consist largely of chlorbenzol.

Instead of washing, the chlorbenzol may be distilled directly and the dissolved hydrochloric acid liberated in part while any unchlorinated benzol saturated with hydrochloric acid, may be returned to the chlorination apparatus.

The reaction of ferric chlorid with finely-divided iron results in the formation of a sub-chlorid and an excess of unchanged iron, the latter being in such intimate contact with the chlorid that the product may be regarded as consisting to a large extent of particles of iron coated with the lower chlorid with which it is also apparently in weak chemical combination.

What I claim is:—

1. A catalyzer adapted for organic bodies which comprises iron chlorid and finely-divided iron in intimate contact and in the form of a very fine powder.

2. The process of chlorinating aromatic hydrocarbons which comprises agitating these with a fine powder containing iron and a sub-chlorid, in the presence of dry chlorin.

3. The process of chlorinating benzol which comprises agitating it with a fine powder containing iron, in the presence of dry air-free chlorin and at a temperature between 10° and 15° C.

4. The process of chlorinating benzol which comprises agitating it with a fine powder containing a catalyzer comprising iron in the presence of chlorin while cooling to a temperature below 15° C.

5. The process of chlorinating benzol which comprises passing through a body of benzol containing an iron catalyzer a current of chlorin gas, in agitating said body during the passage of the gas and in maintaining the temperature by artificial cooling below the point at which substantial quantities of higher chlorinated products are formed.

LOUIS RABINOVITZ.